US012424380B2

(12) United States Patent
Ozawa

(10) Patent No.: US 12,424,380 B2
(45) Date of Patent: Sep. 23, 2025

(54) LAMINATED COIL COMPONENT

(71) Applicant: Murata Manufacturing Co., Ltd., Kyoto-fu (JP)

(72) Inventor: Reiji Ozawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 18/753,816

(22) Filed: Jun. 25, 2024

(65) Prior Publication Data

US 2024/0347266 A1 Oct. 17, 2024

Related U.S. Application Data

(63) Continuation of application No. PCT/JP2023/019918, filed on May 29, 2023.

(30) Foreign Application Priority Data

Jun. 27, 2022 (JP) ................................ 2022-102909

(51) Int. Cl.

| | |
|---|---|
| ***H01F 27/32*** | (2006.01) |
| ***H01F 5/04*** | (2006.01) |
| ***H01F 5/06*** | (2006.01) |

(52) U.S. Cl.

CPC ............ *H01F 27/327* (2013.01); *H01F 5/04* (2013.01); *H01F 5/06* (2013.01)

(58) Field of Classification Search

CPC ............ H01F 27/327; H01F 5/04; H01F 5/06

See application file for complete search history.

(56) References Cited

FOREIGN PATENT DOCUMENTS

| | | | |
|---|---|---|---|
| JP | 2001-267127 A | | 9/2001 |
| JP | 2004-193512 A | | 7/2004 |
| JP | 2004-247577 A | | 9/2004 |
| JP | 2005-216942 A | | 8/2005 |
| JP | 2004247577 | * | 9/2007 |
| JP | 2020-109789 A | | 7/2020 |
| JP | 2021-174817 A | | 11/2021 |
| JP | 2021174817 | * | 11/2021 |

OTHER PUBLICATIONS

International Search Report issued in PCT/JP2023/019918; mailed Jul. 18, 2023.

* cited by examiner

*Primary Examiner* — Nathan T Leong

(74) *Attorney, Agent, or Firm* — Studebaker Brackett PLLC

(57) ABSTRACT

A laminated coil component through which a large current can flow and which is capable of acquiring an impedance in a wide frequency band.

20 Claims, 6 Drawing Sheets

LAMINATED COIL COMPONENT

CROSS-REFERENCE TO RELATED APPLICATIONS

This application claims benefit of priority to International Patent Application No. PCT/JP2023/019918, filed May 29, 2023, and to Japanese Patent Application No. 2022-102909, filed Jun. 27, 2022, the entire contents of each are incorporated herein by reference.

BACKGROUND

Technical Field

The present disclosure relates to a laminated coil component.

Background Art

In recent years, there has been an increasing interest in a coil component through which a large current can flow. For example, Japanese Unexamined Patent Application Publication No. 2020-109789 discloses a coil component that includes a drum-shaped core having a core portion and a flange portion provided at an end portion of the core portion, a wire wound around the core portion, and a terminal electrode to which an end portion of the wire is connected.

SUMMARY

In the laminated coil component disclosed in Japanese Unexamined Patent Application Publication No. 2020-109789, since a coil portion is not covered with a magnetic material, magnetic flux leakage is large, and there is a concern that magnetic flux may interfere with other components when the laminated coil component is mounted on a substrate together with the other components. Accordingly, it is difficult to acquire an impedance in a wide frequency band even though a large current flows. On the other hand, since the magnetic flux leakage is small, the laminated coil component in which the coil is disposed in the magnetic material is preferable.

Accordingly, the present disclosure provides a laminated coil component through which a large current can flow and which is capable of acquiring an impedance in a wide frequency band.

The present disclosure includes the following aspects.

[1] A laminated coil component including a multilayer body in which a plurality of insulator layers and a plurality of coil conductor layers are laminated, and an outer electrode that is provided on a surface of the multilayer body and is electrically connected to the coil conductor layers. The plurality of insulator layers are magnetic materials, the plurality of coil conductor layers are electrically connected to form a coil, an axis of the coil is substantially parallel to a mounting surface, a dimension of the multilayer body in a longitudinal direction is 1.8 mm or more and 2.2 mm or less (i.e., from 1.8 mm to 2.2 mm), and a dimension in a width direction is 1.05 mm or more and 1.45 mm or less (i.e., from 1.05 mm to 1.45 mm), and in a case where the number of turns of the coil is x and a distance between the coil conductor layers is y (mm), (x, y) is within a region surrounded by A1(54, 0.005), B1(54, 0.01), C1(42, 0.01), D1(42, 0.02), E1(36, 0.02), F1(36, 0.03), G1(30, 0.03), H1(30, 0.04), I1(24, 0.04), J1(24, 0.05), K1(18, 0.05), L1(18, 0.01), M1(12, 0.01), and N1(12, 0.005).

[2] In the laminated coil component according to the above [1], the (x, y) is within a region surrounded by A1(54, 0.005), B1(54, 0.01), C1(42, 0.01), D1(42, 0.02), E1(36, 0.02), F1(36, 0.03), H1(30, 0.04), O1(24, 0.03), P1(24, 0.01), L1(18, 0.01), and Q1(18, 0.005).

[3] In the laminated coil component according to the above [1] or [2], a dimension of the multilayer body in a height direction is 1.05 mm or more and 1.45 mm or less (i.e., from 1.05 mm to 1.45 mm).

[4] In the laminated coil component according to any one of the above [1] to [3], an impedance in a frequency band of 10 MHz or more and 1 GHz or less is 300Ω or more (i.e., from 1 GHz to 300Ω.

[5] A laminated coil component including a multilayer body in which a plurality of insulator layers and a plurality of coil conductor layers are laminated, and an outer electrode that is provided on a surface of the multilayer body and is electrically connected to the coil conductor layers. The plurality of insulator layers are magnetic materials, the plurality of coil conductor layers are electrically connected to form a coil, an axis of the coil is substantially parallel to a mounting surface, a dimension of the multilayer body in a longitudinal direction is 3.0 mm or more and 3.4 mm or less (i.e., from 3.0 mm to 3.4 mm), and a dimension in a width direction is 1.4 mm or more and 1.8 mm or less (i.e., from 1.4 mm to 1.8 mm), and in a case where the number of turns of the coil is x and a distance between the coil conductor layers is y (mm), (x, y) is within a region surrounded by A2(84, 0.005), B2(84, 0.01), C2(75, 0.01), D2(75, 0.02), E2(54, 0.02), F2(54, 0.03), G2(42, 0.03), H2(42, 0.04), I2(36, 0.04), J2(36, 0.05), K2(30, 0.05), L2(30, 0.06), M2(18, 0.06), N2(18, 0.03), O2(12, 0.03), P2(12, 0.01), Q2(18, 0.01), and R2(18, 0.005).

[6] In the laminated coil component according to the above [5], the (x, y) is within a region surrounded by A2(84, 0.005), B2(84, 0.01), C2(75, 0.01), D2(75, 0.02), E2(54, 0.02), F2(54, 0.03), G2(42, 0.03), H2(42, 0.04), I2(36, 0.04), J2(36, 0.05), K2(30, 0.05), L2(30, 0.06), S2(24, 0.06), T2(24, 0.04), U2(18, 0.03), V2(24, 0.02), W2(36, 0.02), X2(36, 0.01), Y2(54, 0.01), and Z2(54, 0.005).

[7] In the laminated coil component according to the above [5] or [6], a dimension of the multilayer body in a height direction is 1.4 mm or more and 1.8 mm or less (i.e., from 1.4 mm to 1.8 mm).

[8] In the laminated coil component according to any one of the above [5] to [7], an impedance in a frequency band of 10 MHz or more and 1 GHz or less (i.e., from 10 MHz to 1 GHz) is 300Ω or more.

[9] A laminated coil component including a multilayer body in which a plurality of insulator layers and a plurality of coil conductor layers are laminated, and an outer electrode that is provided on a surface of the multilayer body and is electrically connected to the coil conductor layers. The plurality of insulator layers are magnetic materials, the plurality of coil conductor layers are electrically connected to form a coil, an axis of the coil is substantially parallel to a mounting surface, a dimension of the multilayer body in a longitudinal direction is 3.0 mm or more and 3.4 mm or less (i.e., from 3.0 mm to 3.4 mm), and a dimension in a width direction is 2.3 mm or more and 2.7 mm or less (i.e., from 2.3 mm to 2.7 mm), and in a case where the number of turns of the coil is x and a distance between the coil conductor layers is y (mm), (x, y) is within a region surrounded by A3(84, 0.005), B3(84, 0.01), C3(75, 0.01), D3(75, 0.02), E3(54, 0.02), F3(54, 0.03), G3(42, 0.03), H3(42, 0.04), I3(36, 0.04), J3(36, 0.05), K3(30, 0.05), L3(30, 0.06), M3(12, 0.06), N3(18, 0.05), O3(18, 0.04), P3(24, 0.04), Q3(24, 0.03), R3(36, 0.03), S3(36, 0.02), E3(54, 0.02), T3(54, 0.01), C3(75, 0.01), and U3(75, 0.005).

[10] In the laminated coil component according to the above [9], wherein an impedance in a frequency band of 10 MHz or more and 1 GHz or less (i.e., from 10 MHz to 1 GHz) is 300Ω or more.

[11] In the laminated coil component according to any one of the above [1] to [10], a thickness of the coil conductor layer is 10 μm or more and 25 μm or less (i.e., from 10 μm to 25 μm).

[12] In the laminated coil component according to any one of the above [1] to [11], the coil is electrically connected to the outer electrode by an extended portion.

The present disclosure can provide the laminated coil component through which the large current can flow and which is capable of acquiring the impedance in the wide frequency band.

DETAILED DESCRIPTION

Hereinafter, the present disclosure will be described in detail with reference to the accompanying drawings. However, a shape, disposition, and the like of a laminated coil component and each component are not limited to the illustrated examples.

Figure 1:
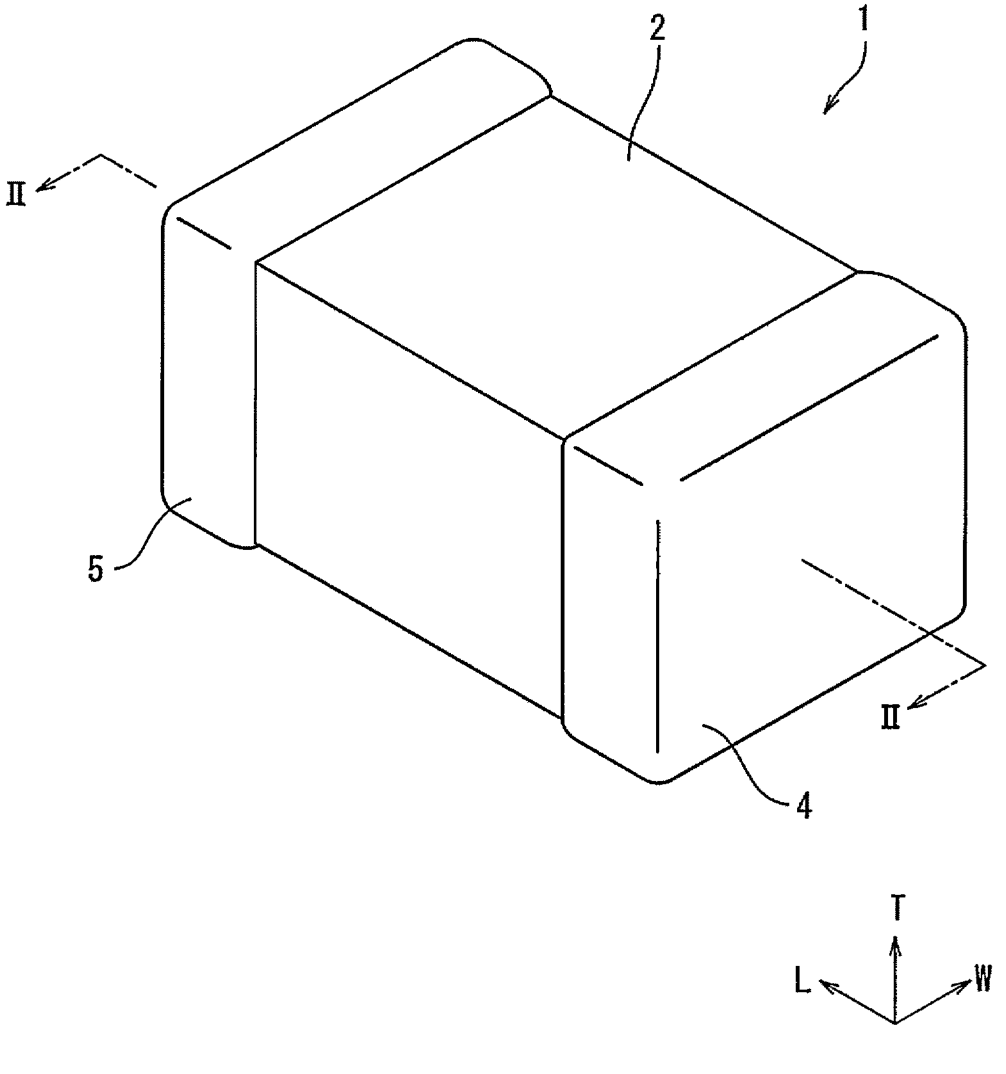
FIG. 1 is a perspective view schematically illustrating a laminated coil component according to the present disclosure.
Figure 2:
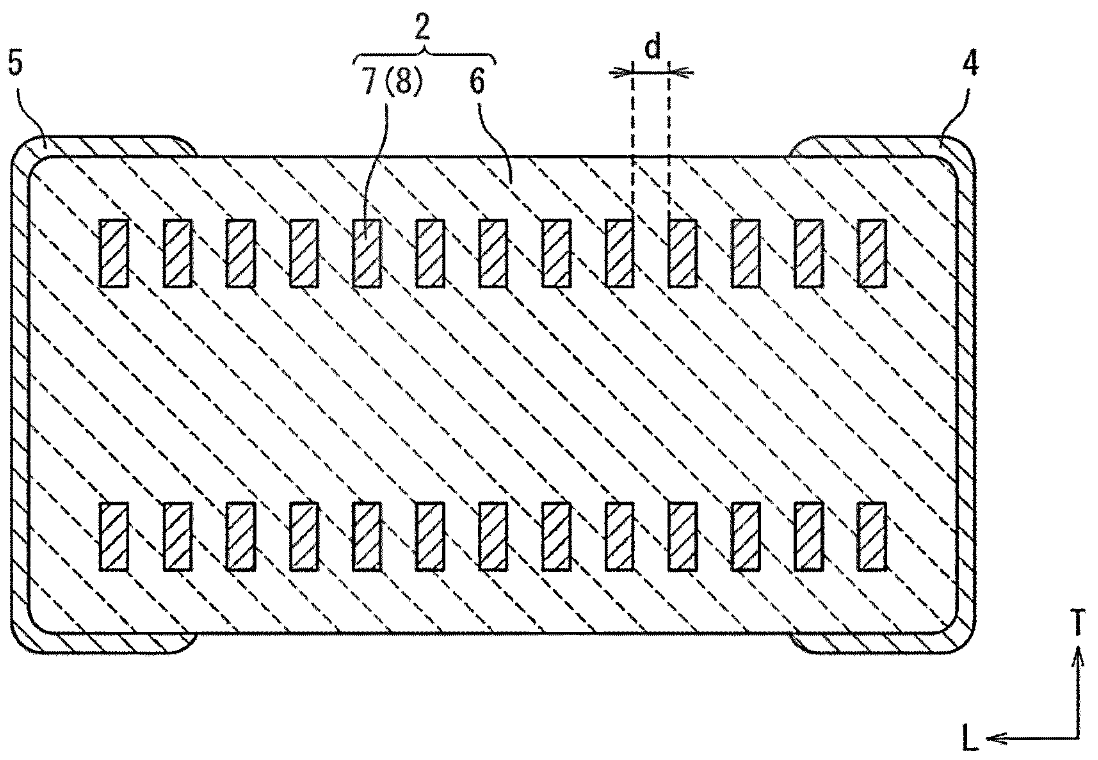
FIG. 2 is a cross-sectional view illustrating a cut surface of the laminated coil component illustrated in FIG. 1 taken along line II-II.

FIG. 1 is a perspective view of a laminated coil component 1 according to the present embodiment, and FIG. 2 is a cross-sectional view thereof. However, a shape, disposition, and the like of the laminated coil component and each component of the following embodiment are not limited to the illustrated examples. In the drawings, members having the same function may be denoted by the same reference sign. A size, a positional relationship, and the like of the members illustrated in the drawings may be exaggerated in order to clarify the description.

As illustrated in FIGS. 1 and 2, the laminated coil component 1 according to the present embodiment is a laminated coil component having a substantially rectangular parallelepiped shape. In the laminated coil component 1, a surface perpendicular to an L-axis in FIG. 1 is referred to as an "end surface", a surface perpendicular to a W-axis is referred to as a "side surface", and a surface perpendicular to a T-axis is referred to as an "upper surface" and a "lower surface". The laminated coil component 1 is mounted on another electronic component such as a substrate on the lower surface. That is, the lower surface of the laminated coil component 1 is a mounting surface. The laminated coil component 1 includes, in an outline, a multilayer body 2 in which a plurality of insulator layers and a plurality of coil conductor layers are laminated, and outer electrodes 4 and 5 provided on a surface of the multilayer body 2. The multilayer body 2 includes an insulator portion 6 and a coil 7 embedded in the insulator portion 6. The insulator portion 6 is formed by laminating a plurality of insulator layers. The coil 7 is formed by laminating a plurality of coil conductor layers 8 and connecting the coil conductor layers adjacent to each other in a lamination direction with a connection conductor. The outer electrodes 4 and 5 are each continuously provided on one end surface and a part of four side surfaces of the multilayer body 2. An axis of the coil 7, that is, a lamination direction of the multilayer body 2, that is, a lamination direction of the insulator layers and the coil conductor layers 8 is substantially parallel to the mounting surface, that is, the lower surface of the laminated coil component.

The laminated coil component 1 according to the present embodiment described above will be described below. In the present embodiment, an aspect in which the insulator portion 6 is made of a ferrite material will be described.

In the laminated coil component 1 according to the present embodiment, the multilayer body 2 includes the insulator portion 6 and the coil 7.

The insulator portion 6 is formed by laminating the plurality of insulator layers.

The insulator portion 6 is preferably made of a magnetic material, and more preferably made of sintered ferrite. The sintered ferrite contains, as main components, at least Fe, Ni, and Zn. The sintered ferrite may further contain Cu.

In one aspect, the sintered ferrite contains, as main components, at least Fe, Ni, Zn, and Cu. The sintered ferrite is preferably a Ni—Cu—Zn-based ferrite.

In the sintered ferrite, a Fe content may be preferably 40.0 mol % or more and 49.5 mol % or less (i.e., from 40.0 mol % to 49.5 mol %) in terms of $Fe_2O_3$ (based on a total of main components, and the same applies hereinafter), and more preferably 45.0 mol % or more and 49.5 mol % or less (i.e., from 45.0 mol % to 49.5 mol %).

In the sintered ferrite, a Zn content may be preferably 2.0 mol % or more and 35.0 mol % or less (i.e., from 2.0 mol % to 35.0 mol %) in terms of ZnO (based on a total of main components, and the same applies hereinafter), and more preferably 10.0 mol % or more and 30.0 mol % or less (i.e., from 10.0 mol % to 30.0 mol %).

In the sintered ferrite, a Cu content is preferably 6.0 mol % or more and 13.0 mol % or less (i.e., from 6.0 mol % to 13.0 mol %) in terms of CuO (based on a total of main components, and the same applies hereinafter), and is more preferably 7.0 mol % or more and 10.0 mol % or less (i.e., from 7.0 mol % to 10.0 mol %).

In the sintered ferrite, a Ni content is not particularly limited, and may be a remainder of Fe, Zn, and Cu, which are other main components described above. For example, the Ni content is preferably 10.0 mol % or more and 45.0 mol % or less (i.e., from 10.0 mol % to 45.0 mol %) in terms of NiO.

In one aspect, in the sintered ferrite, Fe is 40.0 mole % or more and 49.5 mole % or less (i.e., from 40.0 mole % to 49.5 mole %) in terms of $Fe_2O_3$, Zn is 2.0 mole % or more and 35.0 mole % or less (i.e., from 2.0 mole % to 35.0 mole %) in terms of ZnO, Cu is 6.0 mole % or more and 13.0% by mole or less (i.e., from 6.0 mole % to 13.0% by mole) in terms of CuO, and Ni is 10.0 mole % or more and 45.0 mole % or less (i.e., from 10.0 mole % to 45.0 mole %) in terms of NiO.

In the present disclosure, the sintered ferrite may further contain an added component. Examples of the added component in the sintered ferrite include Mn, Co, Sn, Bi, and Si, but the added component is not limited thereto. A content (addition amount) of each of Mn, Co, Sn, Bi, and Si is preferably 0.1 parts by weight or more and 1 part by weight or less (i.e., from 0.1 parts by weight to 1 part by weight) with respect to 100 parts by weight of the total of main components (Fe (in terms of $Fe_2O_3$), Zn (in terms of ZnO), Cu (in terms of CuO), and Ni (in terms of NiO)) in terms of $Mn_3O_4$, $Co_3O_4$, $SnO_2$, $Bi_2O_3$, and $SiO_2$. In addition, the sintered ferrite may further contain inevitable impurities in manufacturing.

A relative permeability of the insulator portion 6 may be preferably 3 or more and 800 or less (i.e., from 3 to 800), more preferably 100 or more and 400 or less (i.e., from 100 to 400), and still more preferably 100 or more and 200 or less (i.e., from 100 to 200).

As described above, the coil 7 is formed by electrically connecting the coil conductor layers 8 to each other in a coil shape. The coil conductor layers 8 adjacent to each other in the lamination direction are connected by the connection conductor (for example, a via conductor) penetrating the insulator portion 6. The coil 7 is electrically connected to the outer electrodes 4 and 5 by an extended portion.

A material constituting the coil conductor layer 8 is not particularly limited, and examples thereof include Au, Ag, Cu, Pd, and Ni. The material constituting the coil conductor layer 8 is preferably Ag or Cu, and more preferably Ag. A conductive material may be only one kind or two or more kinds.

A thickness of the coil conductor layer 8 may be preferably 5 μm or more and 50 μm or less (i.e., from 5 μm to 50 μm), and more preferably 10 μm or more and 25 μm or less (i.e., from 10 μm to 25 μm). The thickness of the coil conductor layer 8 is increased, and thus, a resistance value of the coil conductor layer 8 is further reduced. As a result, a laminated coil component capable of coping with a larger current can be obtained. Here, the thickness of the coil conductor layer refers to a thickness of the coil conductor layer along the lamination direction (L-direction in FIG. 2).

A width of the coil conductor layer 8 may be preferably 100 μm or more and 600 μm or less (i.e., from 100 μm to 600 μm), and more preferably 200 μm or more and 400 μm or less (i.e., from 200 μm to 400 μm). The width of the coil conductor layer 8 is increased, and thus, a resistance value of the coil conductor layer 8 is further reduced. As a result, a laminated coil component capable of coping with a larger current can be obtained. Here, the width of the coil conductor layer refers to a width of the coil conductor layer perpendicular to a winding direction of the coil and the lamination direction.

The thickness of the coil conductor layer can be measured as follows.

An LT surface of a chip is polished in a state of facing sandpaper, and the polishing is stopped at a central portion of the coil conductor layer in a W-dimension. Thereafter, observation is performed with a microscope, and the thickness of the coil conductor layer is measured by a measurement function given to the microscope.

The thickness of the coil conductor layer is measured at a coil conductor layer central portion in a coil conductor layer width direction (T-direction in FIG. 2) in the LT cross section.

The width of the coil conductor layer can be measured as follows.

A TW surface of the chip is polished in a state of facing sandpaper, and the polishing is stopped at a central portion of the coil conductor layer in a L-dimension. Thereafter, observation is performed with a microscope, and the width of the coil conductor layer is measured by a measurement function given to the microscope.

The connection conductor is provided to penetrate the insulator layer. A material constituting the connection conductor may be the material described for the coil conductor layer 8. The material constituting the connection conductor may be the same as or different from the material constituting the coil conductor layer 8. In a preferred aspect, the material constituting the connection conductor is the same as the material constituting the coil conductor layer 8. In a preferred aspect, the material constituting the connection conductor is Ag.

A dimension of the multilayer body 2 in a longitudinal direction (length in the L-direction) may be preferably 1.8 mm or more and 3.4 mm or less (i.e., from 1.8 mm to 3.4 mm), and a dimension in the width direction (length in the W-direction) may be 1.05 mm or more and 2.7 mm or less (i.e., from 1.05 mm to 2.7 mm).

In one aspect, the dimension of the multilayer body 2 in the longitudinal direction may be 1.8 mm or more and 2.2 mm or less (i.e., from 1.8 mm to 2.2 mm), and the dimension in the width direction may be 1.05 mm or more and 1.45 mm or less (i.e., from 1.05 mm to 1.45 mm).

In another aspect, the dimension of the multilayer body 2 in the longitudinal direction may be 3.0 mm or more and 3.4 mm or less (i.e., from 3.0 mm to 3.4 mm), and the dimension in the width direction may be 1.4 mm or more and 1.8 mm or less (i.e., from 1.4 mm to 1.8 mm).

In another aspect, the dimension of the multilayer body 2 in the longitudinal direction may be 3.0 mm or more and 3.4 mm or less (i.e., from 3.0 mm to 3.4 mm), and the dimension in the width direction may be 2.3 mm or more and 2.7 mm or less (i.e., from 2.3 mm to 2.7 mm).

A dimension of the multilayer body 2 in a height direction may be 1.05 mm or more and 1.45 mm or less (i.e., from 1.05 mm to 1.45 mm) in one aspect, 1.4 mm or more and 1.8 mm or less (i.e., from 1.4 mm to 1.8 mm) in another aspect, and 2.3 mm or more and 2.7 mm or less (i.e., from 2.3 mm to 2.7 mm) in still another aspect.

The number of turns of the coil 7 may be preferably 12 or more and 84 or less (i.e., from 12 to 84).

The number of turns of the coil means the so-called number of windings of the coil. That is, the number of turns is increased by 1 whenever the coil is wound by 360°.

A distance between the coil conductor layers in the multilayer body 2 is preferably 0.005 mm or more and 0.06 mm or less (i.e., from 0.005 mm to 0.06 mm), and more preferably 0.005 mm or more and 0.04 mm or less (i.e., from 0.005 mm to 0.04 mm).

The distance between the coil conductor layers can be measured as follows.

An LT surface of a chip is polished in a state of facing sandpaper, and the polishing is stopped at a central portion of the coil conductor layer in a W-dimension. Thereafter, observation is performed with a microscope, and a shortest distance between the coil conductor layers ("d" in FIG. 2) is measured by a measurement function given to the microscope. A shortest distance between all the coil conductor layers in a cross section is measured, and an average thereof is defined as "distance between coil conductor layers".

Figure 4:
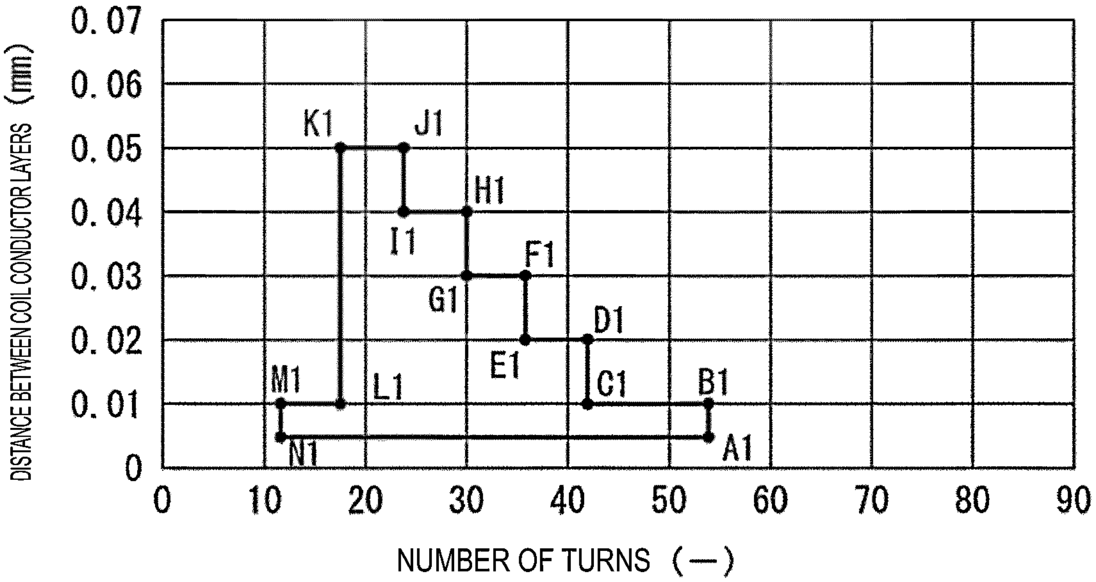
FIG. 4 is a diagram illustrating a region where a laminated coil component A in an example provides an impedance of 300Ω or more.

In one aspect, the dimension of the multilayer body 2 in the longitudinal direction is 1.8 mm or more and 2.2 mm or less (i.e., from 1.8 mm to 2.2 mm), and the dimension in the width direction is 1.05 mm or more and 1.45 mm or less (i.e., from 1.05 mm to 1.45 mm). In a case where the number of turns of the coil 7 of the multilayer body 2 is x and the distance between the coil conductor layers is y (mm), (x, y) is within a region surrounded by A1(54, 0.005), B1(54, 0.01), C1(42, 0.01), D1(42, 0.02), E1(36, 0.02), F1(36, 0.03), G1(30, 0.03), H1(30, 0.04), I1(24, 0.04), J1(24, 0.05), K1(18, 0.05), L1(18, 0.01), M1(12, 0.01), and N1(12, 0.005) as illustrated in FIG. 4.

Figure 5:
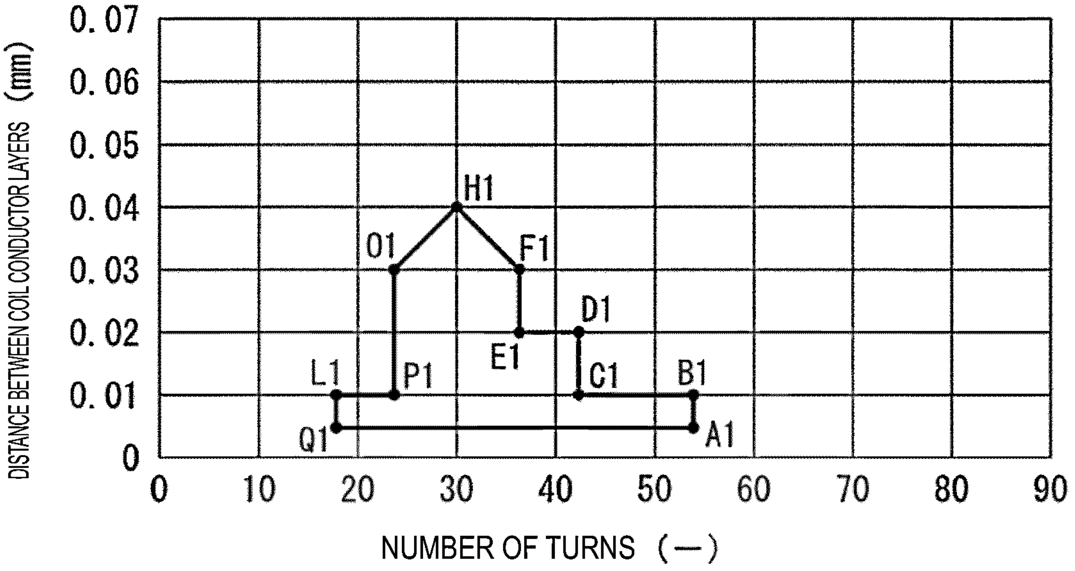
FIG. 5 is a diagram illustrating a region where the laminated coil component A in the example provides an impedance of 500Ω or more.

In a preferred aspect, the dimension of the multilayer body 2 in the longitudinal direction is 1.8 mm or more and 2.2 mm or less (i.e., from 1.8 mm to 2.2 mm), and the dimension in the width direction is 1.05 mm or more and 1.45 mm or less (i.e., from 1.05 mm to 1.45 mm). In a case where the number of turns of the coil 7 of the multilayer body 2 is x and the distance between the coil conductor layers is y (mm), (x, y) is within a region surrounded by A1(54, 0.005), B1(54, 0.01), C1(42, 0.01), D1(42, 0.02), E1(36, 0.02), F1(36, 0.03), H1(30, 0.04), O1(24, 0.03), P1(24, 0.01), L1(18, 0.01), and Q1(18, 0.005) as illustrated in FIG. 5.

Figure 6:
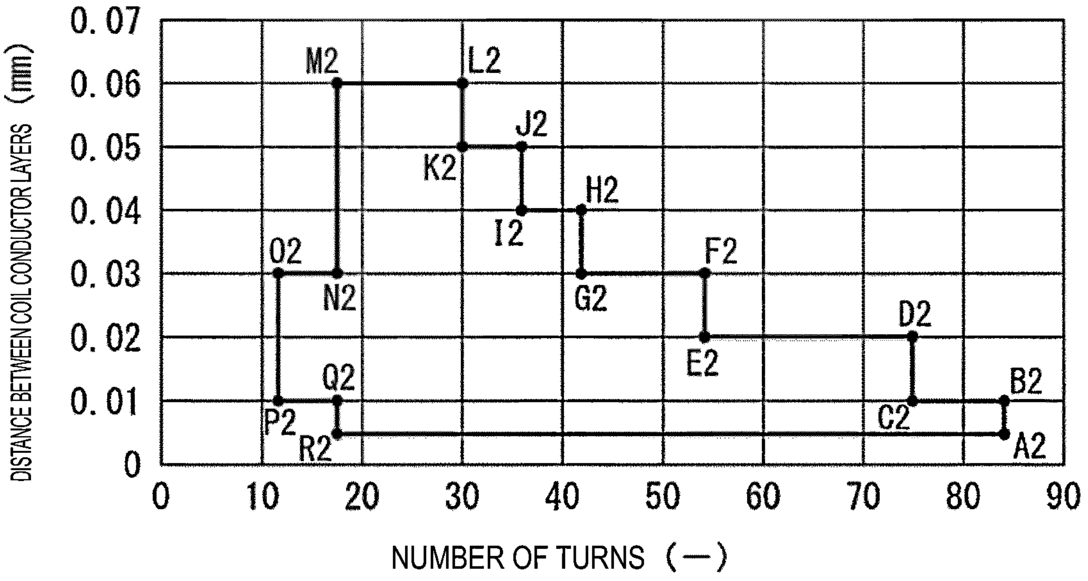
FIG. 6 is a diagram illustrating a region where a laminated coil component B in the example provides an impedance of 300Ω or more.

In one aspect, the dimension of the multilayer body 2 in the longitudinal direction is 3.0 mm or more and 3.4 mm or less (i.e., from 3.0 mm to 3.4 mm), and the dimension in the width direction is 1.4 mm or more and 1.8 mm or less (i.e., from 1.4 mm to 1.8 mm). In a case where the number of turns of the coil 7 of the multilayer body 2 is x and the distance between the coil conductor layers is y (mm), (x, y) is within a region surrounded by A2(84, 0.005), B2(84, 0.01), C2(75, 0.01), D2(75, 0.02), E2(54, 0.02), F2(54, 0.03), G2(42, 0.03), H2(42, 0.04), I2(36, 0.04), J2(36, 0.05), K2(30, 0.05), L2(30, 0.06), M2(18, 0.06), N2(18, 0.03), O2(12, 0.03), P2(12, 0.01), Q2(18, 0.01), and R2(18, 0.005) as illustrated in FIG. 6.

Figure 7:
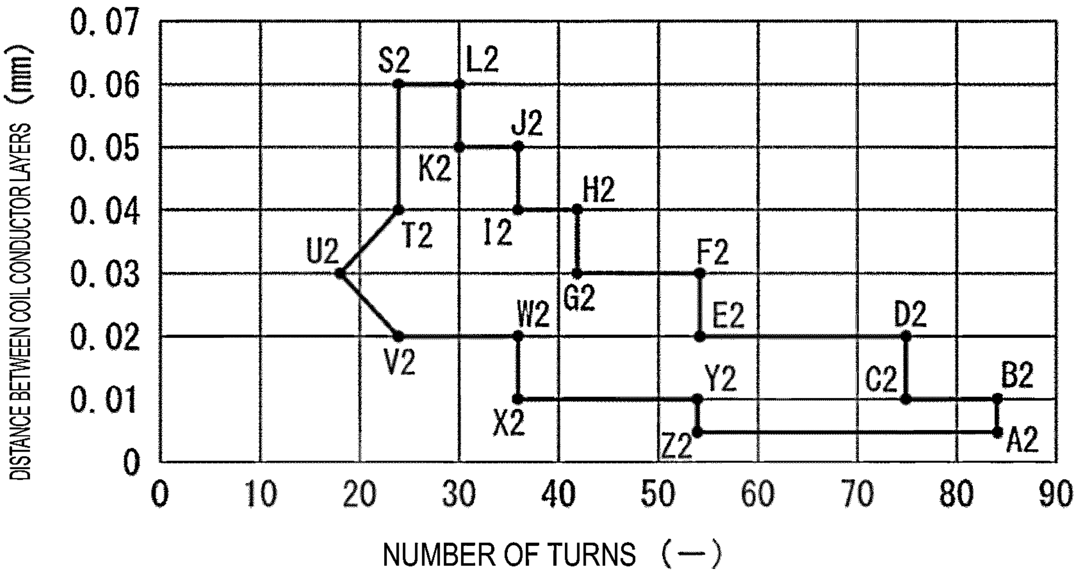
FIG. 7 is a diagram illustrating a region where the laminated coil component B in the example provides an impedance of 500Ω or more.

In a preferred aspect, the dimension of the multilayer body 2 in the longitudinal direction is 3.0 mm or more and 3.4 mm or less (i.e., from 3.0 mm to 3.4 mm), and the dimension in the width direction is 1.4 mm or more and 1.8 mm or less (i.e., from 1.4 mm to 1.8 mm). In a case where the number of turns of the coil 7 of the multilayer body 2 is x and the distance between the coil conductor layers is y (mm), (x, y) is within a region surrounded by A2(84, 0.005), B2(84, 0.01), C2(75, 0.01), D2(75, 0.02, E2(54, 0.02), F2(54, 0.03), G2(42, 0.03), H2(42, 0.04), I2(36, 0.04), J2(36, 0.05, K2(30, 0.05), L2(30, 0.06), S2(24, 0.06), T2(24, 0.04), U2(18, 0.03), V2(24, 0.02), W2(36, 0.02), X2(36, 0.01), Y2(54, 0.01), and Z2(54, 0.005) as illustrated in FIG. 7.

Figure 8:
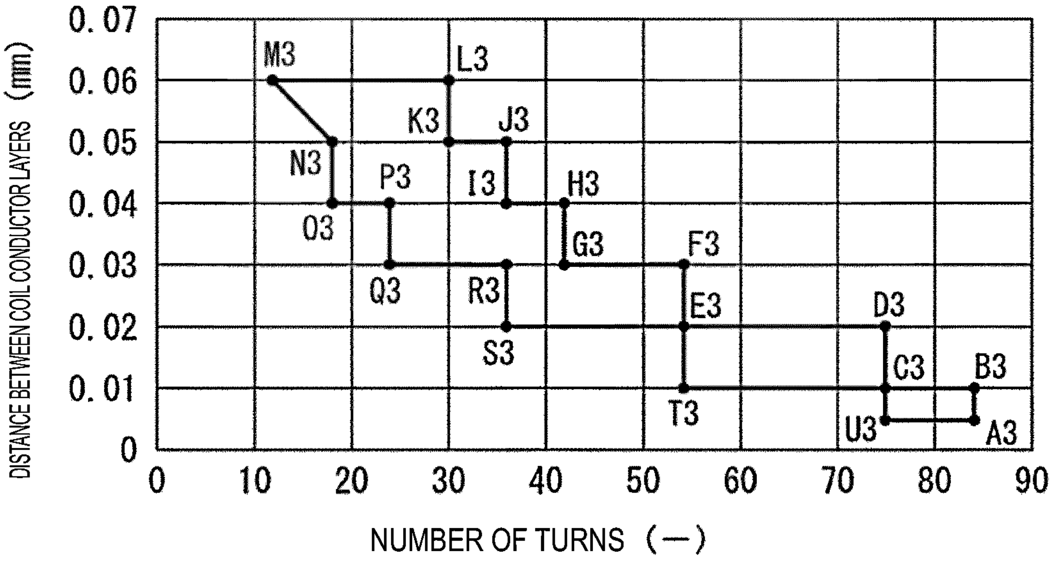
FIG. 8 is a diagram illustrating a region where a laminated coil component C in the example provides an impedance of 300Ω or more.

In one aspect, the dimension of the multilayer body 2 in the longitudinal direction is 3.0 mm or more and 3.4 mm or less (i.e., from 3.0 mm to 3.4 mm), and the dimension in the width direction is 2.3 mm or more and 2.7 mm or less (i.e., from 2.3 mm to 2.7 mm). In a case where the number of turns of the coil 7 of the multilayer body 2 is x and the distance between the coil conductor layers is y (mm), (x, y) is within a region surrounded by A3(84, 0.005), B3(84, 0.01), C3(75, 0.01), D3(75, 0.02), E3(54, 0.02), F3(54, 0.03), G3(42, 0.03), H3(42, 0.04), I3(36, 0.04), J3(36, 0.05), K3(30, 0.05), L3(30, 0.06), M3(12, 0.06), N3(18, 0.05), O3(18, 0.04), P3(24, 0.04), Q3(24, 0.03), R3(36, 0.03), S3(36, 0.02), E3(54, 0.02), T3(54, 0.01), C3(75, 0.01), and U3(75, 0.005) as illustrated in FIG. 8.

A large current can flow through the laminated coil component according to the present disclosure and an impedance in a wide frequency band can be acquired by satisfying the dimensions of the multilayer body and (x, y).

The outer electrodes 4 and 5 are provided to cover both end surfaces of the multilayer body 2. The outer electrode is made of a conductive material, preferably one or more metal materials selected from Au, Ag, Pd, Ni, Sn, and Cu.

The outer electrodes 4 and 5 may be single-layered or multi-layered. In one aspect, the outer electrode may be multi-layered, preferably two or more layers and four or less layers (i.e., from two layers to four layers), for example, three layers.

In one aspect, the outer electrodes 4 and 5 may be multi-layered and may include a layer containing Ag or Pd, a layer containing Ni, or a layer containing Sn. In a preferred aspect, the outer electrodes 4 and 5 include a layer containing Ag or Pd, a layer containing Ni, and a layer containing Sn. Preferably, the layers are provided in the order of a layer containing Ag or Pd, preferably Ag, a layer containing Ni, and a layer containing Sn from a coil conductor layer side. The layer containing Ag or Pd is preferably a layer obtained by baking an Ag paste or a Pd paste, and the layer containing Ni and the layer containing Sn may be a plated layer.

In the laminated coil component according to the present disclosure, the impedance in a frequency band of 10 MHz or more and 1 GHz or less (i.e., from 10 MHz to 1 GHz) may be preferably 300Ω or more and more preferably 500Ω or more.

A current of preferably 500 mA or more and more preferably 1.0 A or more can flow through the laminated coil component according to the present disclosure. An upper limit of a current value at which a current flows through the laminated coil component according to the present disclosure is not particularly limited, but is, for example, 6 A or less.

The method for manufacturing the laminated coil component 1 according to the present embodiment described above will be described below. In the present embodiment, an aspect in which the insulator portion 6 is made of a ferrite material will be described. However, the method for manufacturing the laminated coil component 1 is not limited to the following examples.

(1) Preparation of Magnetic Material

First, the ferrite material is prepared. The ferrite material contains, as main components, for example, Fe, Zn, Cu, and Ni. In general, the main component of the ferrite material is substantially an oxide of Fe, Zn, Cu, and Ni (ideally, $Fe_2O_3$, ZnO, NiO, and CuO).

As the ferrite material, $Fe_2O_3$, ZnO, CuO, NiO, and an added component as necessary are weighed to have a predetermined composition, and are mixed and crushed.

For example, a predetermined composition of a blending raw material is put into a ball mill together with pure water and PSZ (partially stabilized zirconia) balls, and is wet-mixed and crushed for 4 to 8 hours. The crushed ferrite material is dried and calcined to obtain a calcined powder. For example, moisture is evaporated from the crushed ferrite material, and the crushed ferrite material is dried. Thereafter, the dried ferrite material is calcined at a temperature of 700° C. or higher and 800° C. or lower (i.e., from 700° C. to 800° C.) for 2 hours or more and 5 hours or less (i.e., from 2 hours to 5 hours) to obtain the calcined powder.

In the ferrite material, the Fe content may be preferably 40.0 mole % or more and 49.5 mole % or less (i.e., from 40.0 mole % to 49.5 mole %) in terms of $Fe_2O_3$ based on a total of main components, and the same applies hereinafter), and more preferably 45.0 mole % or more and 49.5 mole % or less (i.e., from 45.0 mole % to 49.5 mole %).

In the ferrite material, the Zn content may be preferably 2.0 mol % or more and 35.0 mol % or less (i.e., from 2.0 mol % to 35.0 mol %) in terms of ZnO (based on a total of main components, and the same applies hereinafter), and more preferably 10.0 mol % or more and 30.0 mol % or less (i.e., from 10.0 mol % to 30.0 mol %).

In the ferrite material, the Cu content is preferably 6.0 mol % or more and 13.0 mol % or less (i.e., from 6.0 mol % to 13.0 mol %) in terms of CuO (based on a total of main components, and the same applies hereinafter), and more preferably 7.0 mol % or more and 10.0 mol % or less (i.e., from 7.0 mol % to 10.0 mol %).

In the ferrite material, the Ni content is not particularly limited, and may be a remainder of Fe, Zn, and Cu, which are other main components described above. For example, the Ni content is preferably 10.0 mol % or more and 45.0 mol % or less (i.e., from 10.0 mol % to 45.0 mol %) in terms of NiO.

In one aspect, in the ferrite material, Fe is 40.0 mol % or more and 49.5 mol % or less (i.e., from 40.0 mol % to 49.5 mol %) in terms of $Fe_2O_3$, Zn is 2.0 mol % or more and 35.0 mol % or less (i.e., from 2.0 mol % to 35.0 mol %) in terms of ZnO, Cu is 6.0 mol % or more and 13.0 mol % or less (i.e., from 6.0 mol % to 13.0 mol %) in terms of CuO, and Ni is 10.0 mol % or more and 45.0 mol % or less (i.e., from 10.0 mol % to 45.0 mol %) in terms of NiO.

In the present disclosure, the ferrite material may further contain an added component. Examples of the added component in the ferrite material include Mn, Co, Sn, Bi, and Si, but the added component is not limited thereto. A content (addition amount) of each of Mn, Co, Sn, Bi, and Si is preferably 0.1 parts by weight or more and 1 part by weight or less (i.e., from 0.1 parts by weight to 1 part by weight) with respect to 100 parts by weight of the total of main components (Fe (in terms of $Fe_2O_3$), Zn (in terms of ZnO), Cu (in terms of CuO), and Ni (in terms of NiO)) in terms of $Mn_3O_4$, $Co_3O_4$, $SnO_2$, $Bi_2O_3$, and $SiO_2$. In addition, the ferrite material may further contain inevitable impurities in manufacturing.

The Fe content (in terms of $Fe_2O_3$), the Mn content (in terms of $Mn_2O_3$, the Cu content (in terms of CuO), the Zn content (in terms of ZnO), and the Ni content (in terms of NiO) in the sintered ferrite are considered to be substantially the same as the Fe content (in terms of $Fe_2O_3$), the Mn content (in terms of $Mn_2O_3$), the Cu content (in terms of CuO), the Zn content (in terms of ZnO), and the Ni content (in terms of NiO) in the ferrite material before baking.

(2) Preparation of Ferrite Sheet

The produced calcined powder is put into the ball mill together with the PSZ medium, and an organic binder such as a polyvinyl butyral-based binder, an organic solvent such as ethanol and toluene, and a plasticizer are further put into and mixed in the ball mill. Next, the mixed powder is molded and machined into sheets having a film thickness of 20 μm or more and 50 μm or less (i.e., from of 20 μm to 50 μm) by a doctor blade method or the like, and the sheets are punched into a rectangular shape to produce green sheets.

(3) Preparation of Conductive Paste for Coil Conductor Layer

First, the conductive material is prepared. Examples of the conductive material include Au, Ag, Cu, Pd, and Ni, and the conductive material is preferably Ag or Cu and more preferably Ag. A predetermined amount of conductive material powder is weighed, and the conductive material powder is kneaded together with a predetermined amount of solvent (eugenol or the like), a resin (ethyl cellulose or the like), and a dispersant by using a planetary mixer or the like. Thereafter, the conductive material powder is dispersed by using a three-roll mill or the like, and thus, a conductive paste for a coil conductor layer can be produced.

(4) Production of Coil Pattern

The green sheets obtained above are irradiated with a laser to form via-holes at predetermined locations. Screen printing is performed with the conductive paste. Thus, the via-hole is filled with the conductive paste, and a pattern of the coil conductor layer is formed. For example, as illustrated in FIGS. 3A to 3L, the via-holes are formed in green sheets 21*a* to 21*l*, and via-conductor patterns 31*a* to 31*l* and coil conductor layer patterns 32*c* to 32*j* are formed.

(5) Production of Unbaked Multilayer Body

Figure 3A:
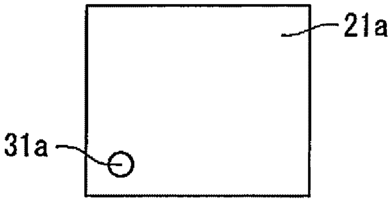
FIGS. 3A to 3L are diagrams for describing a method for manufacturing the laminated coil component according to the present disclosure.
Figure 3B:
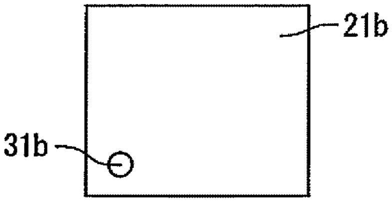
Figure 3C:
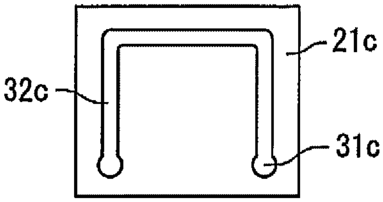
Figure 3D:
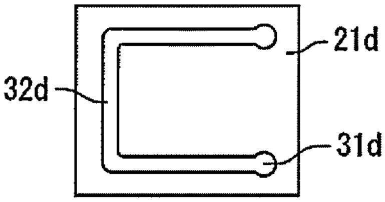
Figure 3E:
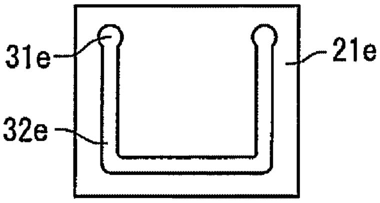
Figure 3F:
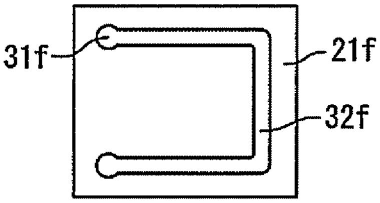
Figure 3G:
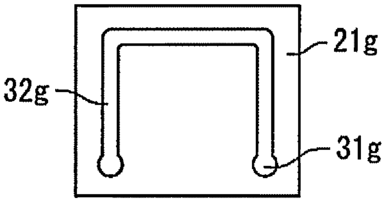
Figure 3H:
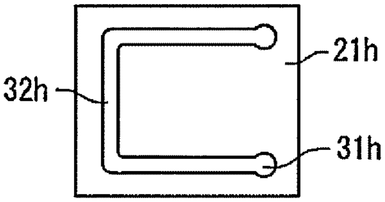
Figure 3I:
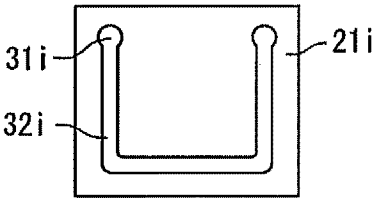
Figure 3J:
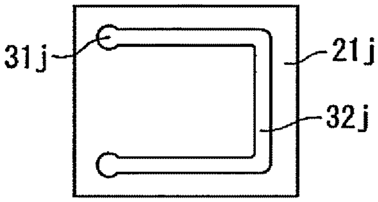
Figure 3K:
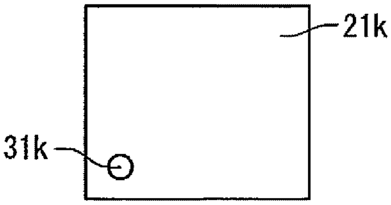
Figure 3L:
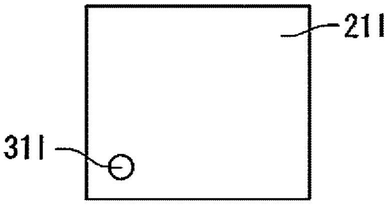

The green sheets on which the coil pattern is formed are stacked in a predetermined order. Specifically, as illustrated in FIGS. 3A and 3B, the green sheets on which the via-conductor patterns are formed are laminated. The laminated green sheets form an exterior of the laminated coil component, and the via-conductor patterns form an extended portion. In such a step, the number of laminated green sheets can be appropriately selected depending on a desired thickness of the exterior. Subsequently, as illustrated in FIGS. 3C to 3J, the green sheets on which the via-conductor patterns and the coil conductor patterns are formed are laminated. The coil pattern formed by the green sheets of FIGS. 3C to 3F has a turn number of 3. In such a step, the number of laminated green sheets can be appropriately selected depending on the desired number of turns. Subsequently, as illustrated in FIGS. 3K and 3L, the green sheets on which the via-conductor patterns are formed are laminated. The laminated green sheets form an exterior of the laminated coil component, and the via-conductor patterns form an extended portion. In such a step, the number of laminated green sheets can be appropriately selected depending on a desired thickness of the exterior. The laminated green sheets are thermally pressure-bonded to produce an unbaked laminated block.

(6) Baking

Next, the unbaked multilayer body block obtained above is cut with a dicer or the like to be individually cut into each element body.

Subsequently, the unbaked element body is baked at a temperature of, for example, 900° C. or higher and 920° C. or lower (i.e., from 900° C. to 920° C.) for 2 to 4 hours to obtain the multilayer body 2 of the laminated coil component 1.

Subsequently, barrel treatment may be performed on the obtained multilayer body 2 to round off corners of the element body. The barrel treatment may be performed on the unbaked multilayer body or may be performed on the multilayer body after baking. In addition, the barrel treatment may be either a dry treatment or a wet treatment. The barrel treatment may be a method for co-rubbing the elements with each other, or a method for performing barrel treatment on the elements together with a medium.

(7) Formation of Outer Electrodes

Next, an Ag paste for forming the outer electrode, containing Ag and glass, is applied onto the end surfaces of the multilayer body 2, and is baked at 800° C. or higher and 820° C. or lower (i.e., from 800° C. to 820° C.) to form a base electrode. A thickness of the base electrode may be preferably 1 μm or more and 10 μm or less (i.e., from 1 μm to 10 μm), and more preferably 3 μm or more and 6 μm or less (i.e., from 3 μm to 6 μm). Next, the outer electrode is formed by sequentially forming a Ni coating and a Sn coating on the base electrode by electrolytic plating, and the laminated coil component 1 illustrated in FIG. 1 is obtained.

Although one embodiment of the present disclosure has been described above, the present embodiment can be variously modified.

Hereinafter, the present disclosure will be described in conjunction with examples, but the present disclosure is not limited to the following examples.

EXAMPLE

Due to use of analysis simulation software Femtet (registered trademark) of Murata Software Co., Ltd., regions where an impedance of 300Ω or more and an impedance of 500Ω or more were obtained were obtained by changing the number of turns and the distance between coil conductor layers in a frequency range of 10 MHz or more and 1 GHz or less (i.e., from 10 MHz to 1 GHz). The simulation was performed on the following laminated coil components A, B, and C.

Laminated coil component A: dimension in longitudinal direction=2.0 mm, dimension in width direction=1.2 mm Laminated coil component B: dimension in longitudinal direction=3.2 mm, dimension in width direction=1.6 mm Laminated coil component C: dimension in longitudinal direction=3.2 mm, dimension in width direction=2.5 mm Simulation Conditions The simulation was carried out by using computer aided engineering (CAE) software Femtet (registered trademark of Murata Software Co., Ltd.). First, a 3D model of the laminated coil component illustrated in FIGS. 1, 2, and 3 was created. A dimension of the laminated coil component in a longitudinal direction was set to 3.100 mm, dimensions in a width direction and a height direction were set to 1.520 mm, a coil inner diameter was set to 0.450 mm, a width of the coil conductor layer was set to 0.210 mm, a thickness of the coil conductor layer was set to 0.018 mm, a land radius was set to 0.125 mm, a via radius was set to 0.060 mm, a dimension of the outer electrode in the longitudinal direction of the laminated coil component was set to 0.775 mm, an interlayer thickness of the coil conductor layer was set in a range of 0.005 mm to 0.060 mm, and a total number of turns of the coil was set in a range of 18.00 turns to 84.00 turns. Materials of the coil conductor portion and the outer electrode were silver. At this time, an element body part of a chip coil component was made of ferrite by setting a relative permittivity of silver to 1.0 and a conductivity to $6.289\times10_7$ S/m. At this time, a relative permittivity of the ferrite was set to 15, a relative permeability and tanδ at 10 MHz were set to 125 and 0.0116, respectively, a relative permeability and tanδ at 100 MHz were set to 42 and 1.4980, respectively, and a relative permeability and tanδ at 1 GHz were set to 1.42 and 8.0975, respectively. Analysis conditions were set for harmonics analysis of electric field analysis, and impedances (|Z| values) at 10 MHz, 100 MHz, and 1 GHz were obtained. (Each relative permittivity, conductivity, relative permeability, and tanδ are actual measured values.)

The obtained results are represented in the following Tables 1 to 3.

TABLE 1 simulation results of laminated coil component A

| Distance between coil conductor layers | Frequency | Number of turns 6 | 12 | 18 | 24 | 30 | 36 | 42 | 54 |
|---|---|---|---|---|---|---|---|---|---|
| 0.06 mm | 10 MHz | 83 | 181 | 262 | x | x | x | x | x |
| | 100 MHz | 519 | 1171 | 1736 | | | | | |
| | 1 GHz | 588 | 831 | 864 | | | | | |
| 0.05 mm | 10 MHz | 89 | 199 | 306 | 415 | x | x | x | x |
| | 100 MHz | 557 | 1297 | 2047 | 2790 | | | | |
| | 1 GHz | 582 | 818 | 876 | 901 | | | | |
| 0.04 mm | 10 MHz | 95 | 222 | 348 | 448 | 575 | x | x | x |
| | 100 MHz | 604 | 1458 | 2364 | 3116 | 3996 | | | |
| | 1 GHz | 567 | 787 | 874 | 879 | 880 | | | |
| 0.03 mm | 10 MHz | 104 | 251 | 403 | 550 | 641 | 802 | x | x |
| | 100 MHz | 662 | 1678 | 2783 | 3896 | 4596 | 5749 | | |
| | 1 GHz | 536 | 734 | 843 | 876 | 877 | 878 | | |
| 0.02 mm | 10 MHz | 114 | 290 | 478 | 667 | 850 | 991 | 1190 | x |
| | 100 MHz | 738 | 1988 | 3388 | 4807 | 6124 | 7010 | 8528 | |
| | 1 GHz | 480 | 655 | 770 | 838 | 861 | 866 | 868 | |
| 0.01 mm | 10 MHz | 127 | 345 | 589 | 841 | 1095 | 1348 | 1588 | 2079 |
| | 100 MHz | 845 | 2448 | 4253 | 5966 | 7431 | 8546 | 9215 | 10047 |
| | 1 GHz | 379 | 528 | 639 | 724 | 782 | 814 | 827 | 830 |
| 0.005 mm | 10 MHz | 135 | 380 | 665 | 966 | 1273 | 1584 | 1894 | 2468 |
| | 100 MHz | 923 | 2742 | 4643 | 6233 | 7453 | 8350 | 8945 | 9350 |
| | 1 GHz | 292 | 423 | 527 | 609 | 675 | 725 | 757 | 785 |

TABLE 2 simulation results of laminated coil component B

| Distance between Coil conductor layers | Frequency | Number of turns 6 | 12 | 18 | 24 | 30 | 36 | 42 | 54 | 75 | 84 |
|---|---|---|---|---|---|---|---|---|---|---|---|
| 0.06 mm | 10 MHz | 105 | 236 | 369 | 500 | 632 | x | x | x | x | x |
| | 100 MHz | 678 | 1607 | 2599 | 3592 | 4552 | | | | | |
| | 1 GHz | 453 | 568 | 631 | 643 | 649 | | | | | |
| 0.05 mm | 10 MHz | 111 | 258 | 408 | 558 | 700 | 850 | x | x | x | x |
| | 100 MHz | 726 | 1779 | 2908 | 4026 | 4968 | 6101 | | | | |
| | 1 GHz | 433 | 543 | 612 | 640 | 641 | 639 | | | | |
| 0.04 mm | 10 MHz | 119 | 285 | 457 | 631 | 804 | 962 | 1138 | x | x | x |
| | 100 MHz | 784 | 1997 | 3294 | 14539 | 5589 | 6229 | 6520 | | | |
| | 1 GHz | 406 | 511 | 582 | 625 | 638 | 639 | 637 | | | |
| 0.03 mm | 10 MHz | 128 | 320 | 524 | 731 | 938 | 1145 | 1341 | 1751 | x | x |
| | 100 MHz | 856 | 2281 | 3777 | 5114 | 6166 | 6834 | 7068 | 7084 | | |
| | 1 GHz | 370 | 470 | 541 | 592 | 622 | 632 | 634 | 632 | | |
| 0.02 mm | 10 MHz | 139 | 365 | 615 | 872 | 1131 | 1392 | 1654 | 2154 | 3043 | x |
| | 100 MHz | 949 | 2636 | 4280 | 5543 | 6419 | 6982 | 7266 | 7182 | 7023 | |
| | 1 GHz | 320 | 414 | 484 | 537 | 578 | 605 | 618 | 625 | 623 | |
| 0.01 mm | 10 MHz | 153 | 428 | 747 | 1086 | 1434 | 1787 | 2144 | 2866 | 4084 | 4578 |
| | 100 MHz | 1078 | 2960 | 4366 | 5215 | 5764 | 6158 | 6455 | 6795 | 6701 | 6653 |
| | 1 GHz | 243 | 329 | 396 | 448 | 491 | 526 | 555 | 588 | 603 | 605 |
| 0.005 mm | 10 MHz | 161 | 467 | 838 | 1239 | 1659 | 2089 | 2526 | 3417 | 5019 | 5700 |
| | 100 MHz | 1154 | 2800 | 3754 | 4340 | 4770 | 5117 | 5415 | 5891 | 6258 | 6255 |
| | 1 GHz | 182 | 258 | 319 | 368 | 410 | 446 | 477 | 525 | 565 | 571 |

TABLE 3 simulation results of laminated coil component C

| Distance between coil conductor layers | Frequency | Number of turns 6 | 12 | 18 | 24 | 30 | 36 | 42 | 54 | 75 | 84 |
|---|---|---|---|---|---|---|---|---|---|---|---|
| 0.06 mm | 10 MHz | 239 | 612 | 1008 | 1387 | 1772 | x | x | x | x | x |
| | 100 MHz | 1714 | 3461 | 4128 | 4308 | 4420 | | | | | |
| | 1 GHz | 249 | 313 | 350 | 364 | 370 | | | | | |
| 0.05 mm | 10 MHz | 251 | 664 | 1115 | 1568 | 1968 | 2415 | x | x | x | x |
| | 100 MHz | 1787 | 3376 | 3943 | 4166 | 4198 | 4180 | | | | |
| | 1 GHz | 234 | 297 | 337 | 357 | 364 | 367 | | | | |
| 0.04 mm | 10 MHz | 266 | 727 | 1248 | 1788 | 2319 | 2770 | 3303 | x | x | x |
| | 100 MHz | 1843 | 3193 | 3666 | 3927 | 4047 | 4061 | 4070 | | | |
| | 1 GHz | 215 | 276 | 318 | 344 | 357 | 363 | 361 | | | |
| 0.03 mm | 10 MHz | 282 | 805 | 1420 | 2074 | 2746 | 3412 | 4008 | 5270 | x | x |
| | 100 MHz | 1850 | 2894 | 3296 | 3577 | 3775 | 3881 | 3910 | 3920 | | |
| | 1 GHz | 193 | 251 | 292 | 323 | 342 | 353 | 358 | 362 | | |
| 0.02 mm | 10 MHz | 302 | 904 | 1649 | 2473 | 3344 | 4051 | 5166 | 6858 | 10170 | x |
| | 100 MHz | 1731 | 2455 | 2816 | 3103 | 3344 | 3490 | 3651 | 3735 | 3742 | |
| | 1 GHz | 166 | 218 | 257 | 288 | 313 | 327 | 342 | 352 | 349 | |
| 0.01 mm | 10 MHz | 327 | 1039 | 1984 | 3088 | 4309 | 15753 | 7027 | 10048 | 15301 | 16842 |
| | 100 MHz | 1321 | 1801 | 2142 | 2428 | 2681 | 2895 | 3082 | 3333 | 3502 | 3498 |
| | 1 GHz | 131 | 171 | 205 | 234 | 258 | 278 | 296 | 321 | 339 | 341 |
| 0.005 mm | 10 MHz | 343 | 1294 | 2246 | 3597 | 5153 | 6975 | 8796 | 13111 | 22375 | 26777 |
| | 100 MHz | 915 | 1269 | 1623 | 1895 | 2139 | 2339 | 2540 | 2842 | 3154 | 3222 |
| | 1 GHz | 111 | 138 | 164 | 189 | 211 | 229 | 248 | 277 | 307 | 314 |

From the above results, for the laminated coil components A to C, the regions where the impedance of 300Ω or more and the impedance of 500Ω or more were obtained were as follows. The number of turns of the coil is x, and the distance between the coil conductor layers is y (mm).

Laminated Coil Component a, 300Ω or More

Region (region illustrated in FIG. 4) surrounded by A1(54, 0.005), B1(54, 0.01), C1(42, 0.01), D1(42, 0.02), E1(36, 0.02), F1(36, 0.03), G1(30, 0.03), H1(30, 0.04), I1(24, 0.04), J1(24, 0.05), K1(18, 0.05), L1(18, 0.01), M1(12, 0.01), and N1(12, 0.005)

Laminated Coil Component a, 500Ω or More

Region (region illustrated in FIG. 5) surrounded by A1(54, 0.005), B1(54, 0.01), C1(42, 0.01), D1(42, 0.02), E1(36, 0.02), F1(36, 0.03), H1(30, 0.04), O1(24, 0.03), P1(24, 0.01), L1(18, 0.01), and Q1(18, 0.005)

Laminated Coil Component B, 300Ω or More

Region (region illustrated in FIG. 6) surrounded by A2(84, 0.005), B2(84, 0.01), C2(75, 0.01), D2(75, 0.02), E2(54, 0.02), F2(54, 0.03), G2(42, 0.03), H2(42, 0.04), I2(36, 0.04), J2(36, 0.05), K2(30, 0.05), L2(30, 0.06), M2(18, 0.06), N2(18, 0.03), O2(12, 0.03), P2(12, 0.01), Q2(18, 0.01), and R2(18, 0.005)

Laminated Coil Component B, 500Ω or More

Region (region illustrated in FIG. 7) surrounded by A2(84, 0.005), B2(84, 0.01), C2(75, 0.01), D2(75, 0.02), E2(54, 0.02), F2(54, 0.03), G2(42, 0.03), H2(42, 0.04), I2(36, 0.04), J2(36, 0.05), K2(30, 0.05), L2(30, 0.06), S2(24, 0.06), T2(24, 0.04), U2(18, 0.03), V2(24, 0.02), W2(36, 0.02), X2(36, 0.01), Y2(54, 0.01), and Z2(54, 0.005)

Laminated Coil Component C, 300Ω or More

Region (region illustrated in FIG. 8) surrounded by A3(84, 0.005), B3(84, 0.01), C3(75, 0.01), D3(75, 0.02), E3(54, 0.02), F3(54, 0.03), G3(42, 0.03), H3(42, 0.04), I3(36, 0.04), J3(36, 0.05), K3 (30, 0.05), L3(30, 0.06), M3(12, 0.06), N3(18, 0.05), O3(18, 0.04), P3(24, 0.04), Q3(24, 0.03), R3(36, 0.03), S3(36, 0.02), E3(54, 0.02), T3(54, 0.01), C3(75, 0.01), and U3(75, 0.005)

The laminated coil component according to the present disclosure can be used for various applications as an inductor or the like.

What is claimed is:

1. A laminated coil component comprising:

a multilayer body in which a plurality of insulator layers and a plurality of coil conductor layers are laminated; and an outer electrode that is on a surface of the multilayer body and is electrically connected to the coil conductor layers, wherein the plurality of insulator layers are magnetic materials, the plurality of coil conductor layers are electrically connected to configure a coil, an axis of the coil is substantially parallel to a mounting surface, a dimension of the multilayer body in a longitudinal direction is from 1.8 mm to 2.2 mm, and a dimension in a width direction is from 1.05 to 1.45 mm, and where a number of turns of the coil is x and a distance between the coil conductor layers is y (mm), (x, y) is within a region surrounded by A1(54, 0.005), B1(54, 0.01), C1(42, 0.01), D1(42, 0.02), E1(36, 0.02), F1(36, 0.03), G1(30, 0.03), H1(30, 0.04), I1(24, 0.04), J1(24, 0.05), K1(18, 0.05), L1(18, 0.01), M1(12, 0.01), and N1(12, 0.005).

2. The laminated coil component according to claim 1, wherein the (x, y) is within a region surrounded by A1(54, 0.005), B1(54, 0.01), C1(42, 0.01), D1(42, 0.02), E1(36, 0.02), F1(36, 0.03), H1(30, 0.04), O1(24, 0.03), P1(24,001), L1(18, 0.001), and Q1(18, 0.005).

3. The laminated coil component according to claim 2, wherein a thickness of the coil conductor layer is from 10 μm to 25 μm.

4. The laminated coil component according to claim 2, wherein the coil is electrically connected to the outer electrode by an extended portion.

5. The laminated coil component according to claim 1, wherein a dimension of the multilayer body in a height direction is from 1.05 mm to 1.45 mm.

6. The laminated coil component according to claim 5, wherein a thickness of the coil conductor layer is from 10 μm to 25 μm.

7. The laminated coil component according to claim 5, wherein the coil is electrically connected to the outer electrode by an extended portion.

8. The laminated coil component according to claim 1, wherein an impedance in a frequency band of from 10 MHz to 1 GHz is 300Ω or more.

9. The laminated coil component according to claim 1, wherein a thickness of the coil conductor layer is from 10 μm to 25 μm.

10. The laminated coil component according to claim 1, wherein the coil is electrically connected to the outer electrode by an extended portion.

11. A laminated coil component comprising:

a multilayer body in which a plurality of insulator layers and a plurality of coil conductor layers are laminated; and an outer electrode that is on a surface of the multilayer body and is electrically connected to the coil conductor layers, wherein the plurality of insulator layers are magnetic materials, the plurality of coil conductor layers are electrically connected to configure a coil, an axis of the coil is substantially parallel to a mounting surface, a dimension of the multilayer body in a longitudinal direction is from 3.0 mm to 3.4 mm, and a dimension in a width direction is from 1.4 mm to 1.8 mm, and where a number of turns of the coil is x and a distance between the coil conductor layers is y (mm), (x, y) is within a region surrounded by A2(84, 0.005), B2(84, 0.01), C2(75, 0.01), D2(75, 0.02), E2(54, 0.02), F2(54, 0.03), G2(42, 0.03), H2(42, 0.04), I2 (36, 0.04), J2(36, 0.05), K2(30, 0.05), L2(30, 0.06), M2(18, 0.06), N2(18, 0.03), O2(12, 0.03), P2(12, 0.01), Q2(18, 0.01), and R2(18, 0.005).

12. The laminated coil component according to claim 11, wherein the (x, y) is within a region surrounded by A2(84, 0.005), B2(84, 0.01), C2(75, 0.01), D2(75, 0.02), E2(54, 0.02), F2(54, 0.03), G2(42, 0.03), H2(42, 0.04), I2(36, 0.04), J2(36, 0.05), K2(30, 0.05), L2(30, 0.06), S2(24, 0.06), T2(24, 0.04), U2(18, 0.03), V2(24, 0.02), W2(36, 0.02), X2(36, 0.01), Y2(54, 0.01), and Z2(54, 0.005).

13. The laminated coil component according to claim 11, wherein a dimension of the multilayer body in a height direction is from 1.4 mm to 1.8 mm.

14. The laminated coil component according to claim 11, wherein an impedance in a frequency band of from 10 MHz to 1 GHz is 300Ω or more.

15. The laminated coil component according to claim 11, wherein a thickness of the coil conductor layer is from 10 μm to 25 μm.

16. The laminated coil component according to claim 11, wherein the coil is electrically connected to the outer electrode by an extended portion.

17. A laminated coil component comprising:

a multilayer body in which a plurality of insulator layers and a plurality of coil conductor layers are laminated; and an outer electrode that is on a surface of the multilayer body and is electrically connected to the coil conductor layers, wherein the plurality of insulator layers are magnetic materials, the plurality of coil conductor layers are electrically connected to configure a coil, an axis of the coil is substantially parallel to a mounting surface, a dimension of the multilayer body in a longitudinal direction is from 3.0 mm to 3.4 mm, and a dimension in a width direction is from 2.3 mm to 2.7 mm, and where a number of turns of the coil is x and a distance between the coil conductor layers is y (mm), (x, y) is within a region surrounded by A3(84, 0.005), B3(84, 0.01), C3(75, 0.01), D3(75, 0.02), E3(54, 0.02), F3(54, 0.03), G3(42, 0.03), H3(42, 0.04), I3(36, 0.04), J3(36, 0.05), K3(30, 0.05), L3(30, 0.06), M3(12, 0.06), N3(18, 0.05), O3(18, 0.04), P3(24, 0.04), Q3(24, 0.03), R3(36, 0.03), S3(36, 0.02), E3(54, 0.02), T3(54, 0.01), C3(75, 0.01), and U3(75, 0.005).

18. The laminated coil component according to claim 17, wherein an impedance in a frequency band of from 10 MHz to 1 GHz is 300Ω or more.

19. The laminated coil component according to claim 17, wherein a thickness of the coil conductor layer is from 10 μm to 25 μm.

20. The laminated coil component according to claim 17, wherein the coil is electrically connected to the outer electrode by an extended portion.

* * * * *